Figure 1:
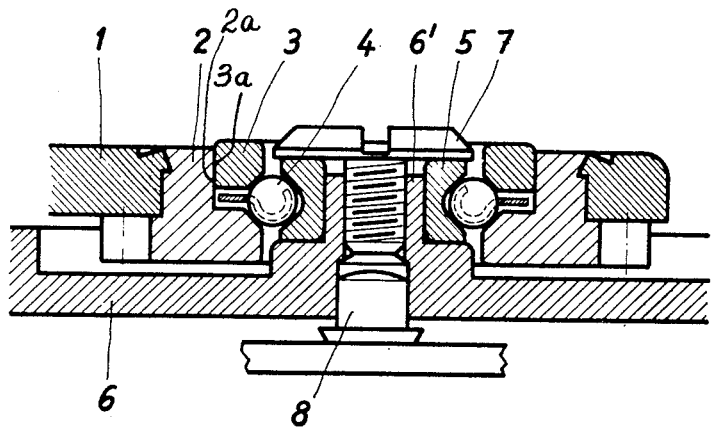

Aug. 17, 1954     R. ANNEN     2,686,397
BALL BEARING FOR WINDING ROCKERS IN SELF-WINDING
WATCH AND CLOCK MOVEMENTS
Filed May 2, 1949     2 Sheets-Sheet 1

INVENTOR
ROBERT ANNEN
BY
Young, Emery & Thompson
ATTYS.

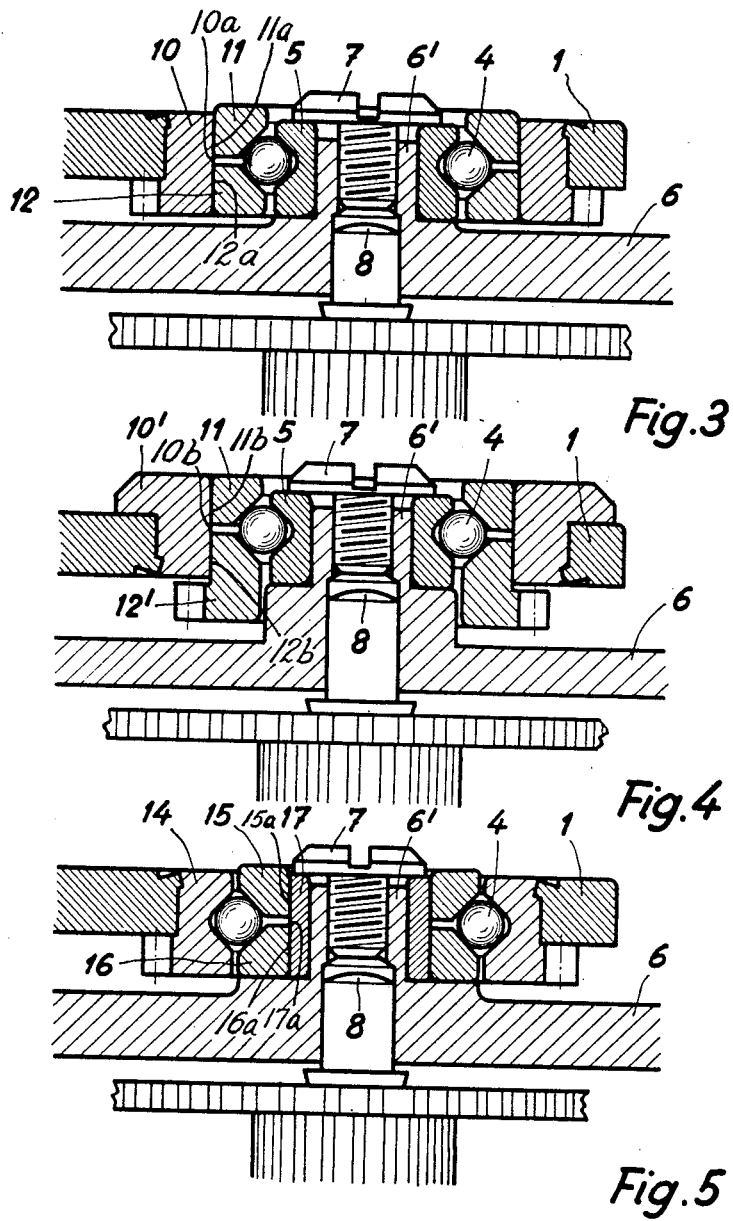

Patented Aug. 17, 1954

2,686,397

UNITED STATES PATENT OFFICE 2,686,397

BALL BEARING FOR WINDING ROCKERS IN SELF-WINDING WATCH AND CLOCK MOVEMENTS

Robert Annen, Bienne, Switzerland, assignor to Roulements à Billes Miniatures S. A., Bienne, Switzerland Application May 2, 1949, Serial No. 90,972

Claims priority, application Switzerland May 1, 1948

6 Claims. (Cl. 58—82)

The present invention relates generally to self-winding watch and clock movements having a winding rocker, and more particularly to a ball bearing for such rockers.

The primary object of the invention is to provide for a construction and arrangement of such a ball bearing which will make it possible to manufacture and to readily mount the several parts in less time and with greater ease than it was possible hitherto.

Another object of this invention is to provide a bearing of the kind referred to above and having at least three races, two of which are located on either side of the ball row, adjustable with regard to each other in order to permit adjusting the play of the bearing.

Other objects of this invention will appear hereinafter as the description of the invention proceeds, the novel features, combinations and construction being more particularly pointed out in the description and the claims hereunto appended.

The accompanying drawings represent, by way of examples, some embodiments of a ball bearing for winding rockers, made according to the invention.

In the drawings:

Fig. 1 is a sectional view of a first embodiment, and

Figure 2:
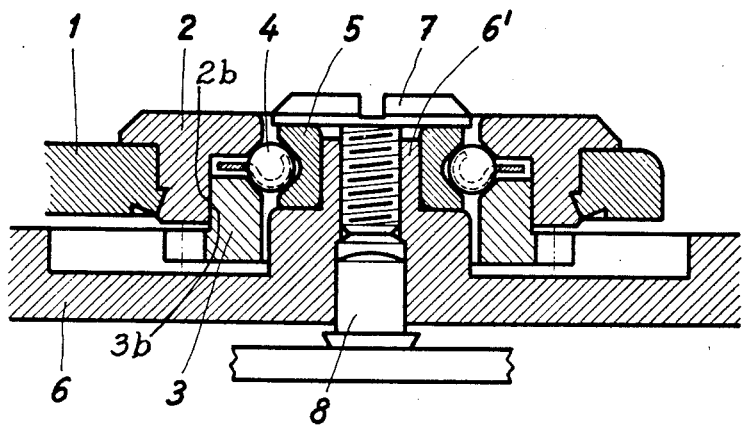

Figs. 2 to 4 inclusive are similar sectional views of a second, a third, a fourth and a fifth embodiment, respectively.

Referring now to Fig. 1 of the drawings, the arm of the winding rocker is designated by 1. An exterior ring 2 having an interior cylindrical surface 2a, is set in the center of this arm 1. An auxiliary ring 3 having an exterior cylindrical surface 3a is forced into the exterior ring 2 so that the cylindrical surfaces 2a and 3a are in permanent gripping contact. Each of the rings 2 and 3 is provided with a conical shoulder-type race for a row of balls 4. These rings 2 and 3 are located on either side of the ball row, i. e. on either side of each ball 4 in axial direction, of the bearing, but neither at the inside and at the outside of the ball row, nor on diametrically opposite sides (in radial direction) of the ball row.

An inner ring or core 5 is mounted with sliding fit onto a tenon 6' of a plate or another fixed supporting member of the watch or clock movement, and held in place axially by a screw 7 engaging a threaded hole of said tenon 6'. This inner ring or core 5 has two other races for the ball row.

8 is the upper pivot of the center wheel of the movement.

On mounting together the parts of the ball bearing, at first the members 2, 4 and 5 are brought into their respective positions which they occupy in Fig. 1. Thereafter, the auxiliary ring 3 is forced into the wider portions of the bore of the external ring 2 and pressed down until the play of the bearing assembly has the value desired. It should be noted that, in fact, this play must not exceed 0.005 mm. in order that the winding rocker is well guided and retained from moving in the direction of the axis of the bearing.

The complete bearing and rocker assemblies may easily be fixed to the watch movement by putting their internal ring 5 onto the tenon 6' and securing it by means of the screw 7. Inversely, the dismounting thereof is also very easy.

The embodiment shown in Fig. 2 comprises also the parts 1 to 8, the shape and function of which is identical or nearly similar to the corresponding parts of the first embodiment. The interfitted interior and exterior cylindrical surfaces, corresponding to 2a and 3a of Fig. 1, are shown at 2b and 3b, respectively, Fig. 2. However, the auxiliary ring 3, which constitutes also the first pinion of the gearing of the automatic winding mechanism, is located below the exterior ring 2.

The mounting of the bearing assembly and the adjusting of the play thereof are done in a manner similar to that described in relation to Fig. 1.

In the above described embodiments, the two races adjustable with regard to each other are exterior raceways of the ball bearing, one of these races being provided on an exterior ring supporting the winding-rocker, while the other is provided on an auxiliary race forced into a bore of said exterior ring.

There will now be described with reference to Figs. 3 to 5 embodiments in which each of said two races adjustable with regard to each other is provided on an auxiliary ring, both auxiliary rings being forced, that is to say forcibly fitted onto a cylindrical surface of a ring pertaining to the bearing.

The embodiment shown in Fig. 3, again comprises the arm 1 of the winding-rocker, the plate or bridge 6 of the self-winding watch or clock movement, in which the pivot 8 of the center wheel rotates.

In both embodiments of Figs. 3 and 4, an exterior ring 10 and 10', respectively, of the ball bearing, having interior cylindrical surfaces 10a and 10b, respectively is set in the arm 1 of the winding rocker. Auxiliary rings 11, 12 and 12', respectively, having exterior cylindrical surfaces 11b and 12b, respectively, are forcibly fitted into the bore of the exterior ring 10 and 10' respectively, in a manner well known per se in the art of watch and clock making. According to this practice, the external surface of the auxiliary rings 11, 12 and 12', respectively, are finished by means of a die before the parts are heat-treated. The bore of the ring 10 (or 10'), too, is finished in a similar manner. This finishing being done with an accuracy of 0.0025 mm., the interchangeability of the parts is readily obtained. The auxiliary rings made with an average oversize of 0.01 mm. are forced into the bore of the exterior ring.

Each of these auxiliary rings has one shoulder-type race, and the interior ring 5, easily fitting the tenon 6' of the part 6 and secured thereto by means of the screw 7, is provided with two further races. There are thus four races for the balls 4. The play of the ball bearing is made not to exceed 0.005 mm., by readily adjusting the auxiliary rings with regard to each other and approaching more or less their raceways located on either side of the ball row.

In these embodiments, too, the interior ring 5 and the parts 4, 11, 12 or 12', 10 or 10' constitute permanent assemblies which can easily be handled by the repairer.

The only feature distinguishing the embodiments shown in Figs. 3 and 4 from each other resides in the fact that in the first of these examples, the teeth pertaining to the winding gearing next to the winding rocker are provided on the exterior ring 10, while in the second example, these teeth are provided on the auxiliary ring 12'.

In the embodiment shown in Fig. 5, an exterior ring 14 having a groove providing for two raceways and adapted to constitute the first toothed wheel of the winding mechanism, is fitted into the arm 1 of the winding-rocker.

Two auxiliary rings 15 and 16, each provided with an internal race, are driven onto an interior ring 17 easily fitting the tenon 6' of the plate or bridge 6 and maintained by the screw 7. Rings 15 and 16 are provided with interior cylindrical surfaces 15a and 16a, respectively, which permanently grip the exterior cylindrical surface 17a of ring 17. The rings 15, 16 and 17 are machined and adjusted with the same accuracy as the corresponding parts of the preceding embodiments, that is to say, they are also rectified by means of a die. Here, too, the adjusting of the auxiliary rings 15 and 16 and, therefore, of their raceways located on either side of the ball row, is made so that the play of the bearing will not exceed 0.005 mm.

It would also be possible to make one of the auxiliary rings 15 and 16 in one piece with the interior ring 17, which would lead to an embodiment similar to the embodiments shown in Figs. 1 and 2.

It should furthermore be noted that in all of these embodiments the two raceways provided on the same ring could be replaced by a single raceway, the cross section of which ought to be made substantially the same as that of the balls.

The ball bearings according to the invention meet in a high degree the conditions of solidity and working accuracy required. They are furthermore remarkable by their small height, which is in very keen demand in watchmaking. Due to the fact that the parts need not be gauged and adapted in pairs, and to other features described hereabove, these bearings offer the advantage of a low manufacturing cost which attains approximately half of that of sliding bearings.

While I have shown and described different embodiments of my invention, I wish it to be understood that I do not desire to be limited to the details thereof as various modifications may occur to a person skilled in the art.

What I claim is:

1. In a unitary assembly for a self-winding watch, an oscillatable member including a winding-weight-carrying arm; an outer ring secured therein; two auxiliary race-forming rings secured permanently by forced press fitting into said outer ring; gear teeth carried by and integral with one of said three rings adapted to transmit movement of said oscillatable member to the watch in which it is to be mounted; an inner race-forming ring; ball bearings positioned between said race-forming rings; all of said parts being permanently secured together by said forced fit of the two auxiliary rings into said outer ring to form a unitary assembly which may be applied to or removed from a watch as a unit.

2. In a unitary assembly for a self-winding watch, an oscillatable member including a winding-weight-carrying arm an outer ring secured therein; ring means forming an outer race, positioned in said outer ring; ring means forming an inner race; ball bearings positioned in the raceway formed by said ring means; said ring means forming the outer race being permanently and non-separably secured within said outer ring by forced press fitting into said outer ring; and gear teeth carried by and integral with said outer ring, adapted to transmit movements of said oscillatable member to the watch in which it is to be mounted.

3. In a unitary assembly for a self-winding watch, an oscillatable member including a winding-weight-carrying arm and an exterior holding ring secured therein, said exterior ring being provided with an interior substantially cylindrical surface; two auxiliary race-forming rings carried by and mounted in said exterior ring, said auxiliary rings having exterior substantially cylindrical surfaces, said auxiliary rings being permanently secured in place by forcing them into the exterior ring with a forced press fit, with said cylindrical surfaces of the interior and auxiliary rings in permanent gripping contact; and inner race-forming ring; ball bearings mounted in the raceway formed by said race-forming rings; and gear teeth carried by one of said rings, adapted to transmit movements of said oscillatable member to the watch in which it is adapted to be mounted.

4. The combination as set forth in claim 3, wherein said gear teeth are carried by said exterior ring.

5. The combination as set forth in claim 3, wherein said gear teeth are carried by one of said auxiliary rings.

6. In a unitary assembly for a self-winding watch, a mounting ring having a substantially cylindrical surface, ring means forming a movable outer race, ring means forming a stationary inner race, ball bearings in the raceway formed by said races, one of said ring means being forcibly press fitted into tight frictional engagement with the cylindrical surface of said mounting ring for thereby permanently securing these members together, said movable outer race having an oscillatable weight-carrying arm fixed to move therewith, and gear teeth operatively connected with said ring means forming said movable outer race, for transmitting movements of the weight-carrying arm to the watch in which the assembly is to be mounted.

References Cited in the file of this patent

UNITED STATES PATENTS

| Number | Name | Date |
|---|---|---|
| 651,376 | Morrill | June 12, 1900 |
| 1,782,622 | Kilian | Nov. 25, 1930 |
| 1,914,015 | Hatot | June 13, 1933 |
| 1,923,211 | Jarvis | Aug. 22, 1933 |

FOREIGN PATENTS

| Number | Country | Date |
|---|---|---|
| 363,128 | France | June 12, 1900 |
| 143,765 | Switzerland | Feb. 2, 1931 |
| 746,608 | France | Mar. 14, 1933 |
| 170,501 | Switzerland | Oct. 16, 1934 |
| 247,037 | Switzerland | Feb. 15, 1947 |
| 247,269 | Switzerland | Nov. 17, 1947 |
| 249,416 | Switzerland | Apr. 1, 1948 |